US005538062A

United States Patent [19]

Stech

[11] Patent Number: 5,538,062

[45] Date of Patent: Jul. 23, 1996

[54] PNUEMATIC TIRE INFLATION SYSTEM

[75] Inventor: Clyde G. Stech, LaGrange, Tex.

[73] Assignee: Marks-RMS, Inc., Corpus Christi, Tex.

[21] Appl. No.: 289,454

[22] Filed: Aug. 12, 1994

[51] Int. Cl.[6] .......... B60C 23/00

[52] U.S. Cl. .......... 152/417; 152/415

[58] Field of Search .......... 152/415, 416, 152/417

[56] References Cited

U.S. PATENT DOCUMENTS

| | | | |
|---|---|---|---|
| 902,644 | 11/1908 | Boyd | 152/417 |
| 1,005,149 | 10/1911 | Brink | 152/417 |
| 1,054,504 | 2/1913 | Burgraff, Jr. | 152/417 |
| 1,165,057 | 12/1915 | Bayly | 152/417 |
| 1,165,876 | 12/1915 | Heberling | 152/417 |
| 1,205,504 | 11/1916 | Bearce | 152/417 |
| 2,107,405 | 2/1938 | Williams | 152/417 |
| 4,676,289 | 6/1987 | Yi Su | 152/210 |
| 4,685,501 | 8/1987 | Williams | 152/417 |
| 4,883,106 | 11/1989 | Schultz et al. | 152/417 |
| 5,080,156 | 1/1992 | Bartos | 152/417 |
| 5,097,875 | 3/1992 | Grenie et al. | 141/38 |

*Primary Examiner*—Michael W. Ball
*Assistant Examiner*—Francis J. Lorin
*Attorney, Agent, or Firm*—Fulbright & Jaworski

[57] ABSTRACT

An air inflation system for attachment to rotating wheels having outwardly directed studs for inflating a tire thereon. An elongate support is threadably attached to a stud on the wheel for supporting the support. An adjustable arm is rotatably connected to the support and in turn supports a rotatable air coupling. An air supply line is connected to the coupling and an outlet line from the coupling supplies air to a tire on the wheel.

5 Claims, 2 Drawing Sheets

Fig. 1
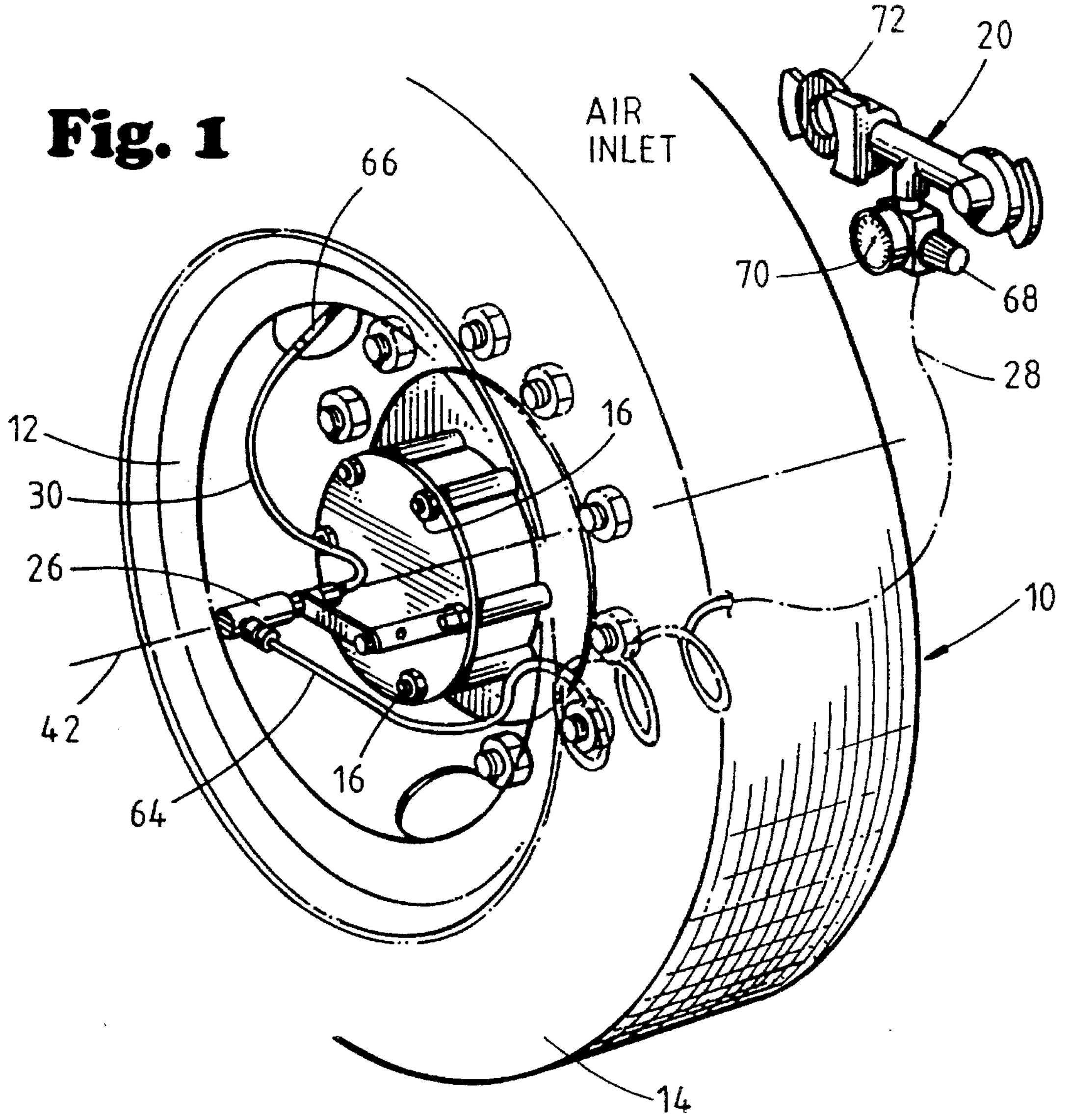
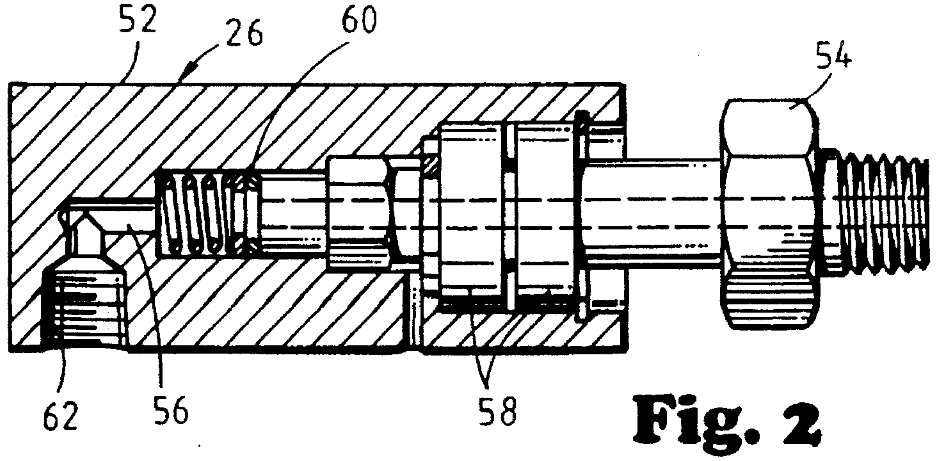
Fig. 2

PNUEMATIC TIRE INFLATION SYSTEM

BACKGROUND OF THE INVENTION

The present invention is directed to a pneumatic tire inflation system for attachment to a rotating wheel having outwardly directed studs for inflating a tire thereon.

Frequently, when pneumatic tires have a slow leak, or even a flat, it is not convenient for the driver to change tires. This is particularly true in large trucks where road service is required to change tires. It is much more convenient, assuming that the tire can be maintained with a sufficient amount of air to prevent damage, to drive the vehicle to a location where the tire can conveniently be change. The present invention is directed to a system which can be attached to and supply air to a tire while the wheel is rotating. This is particularly advantageous for providing temporary air supply to the tire to allow the vehicle to continue to a facility where the tire may be replaced.

SUMMARY

The present invention is directed to a pneumatic tire inflation system for attachment to rotating wheels having outwardly directed studs. The system includes an elongate support having first and second ends and the first end includes threads for engaging a stud on a wheel for supporting the support. A rotatably adjustable arm having first and second ends is provided with the first end connected to the second end of the elongate support. A rotatably adjustable connection is provided between the second end of the support and the first end of the arm for rotatably adjusting the position of the second end of the arm. A rotatable air coupling is connected to the second end of the arm. The coupling includes first and second parts sealably and rotatably movable relative to each other. An air supply line is connected to the first part and an air outlet line is connected to the second part for supplying air to a tire on the wheel.

A still further object is wherein the second end of the arm is adjustable to the center line of the wheel.

Still a further object is wherein the first part of the coupling is a tubular member having a side port connected to the air supply line.

Yet a further object is wherein the arm is positioned perpendicular to the elongate support and the coupling is positioned perpendicular to the arm.

A further object is wherein the rotatably adjustable connection includes a pivot screw threadably connected to the second end of the elongate support.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is a schematic and perspective elevational view of the present system attached to the wheel of a vehicle, FIG. 2 is a an enlarged elevational view, in cross section, of the air coupling used in the system.

DESCRIPTION OF THE PREFERRED EMBODIMENT

Figure 3:
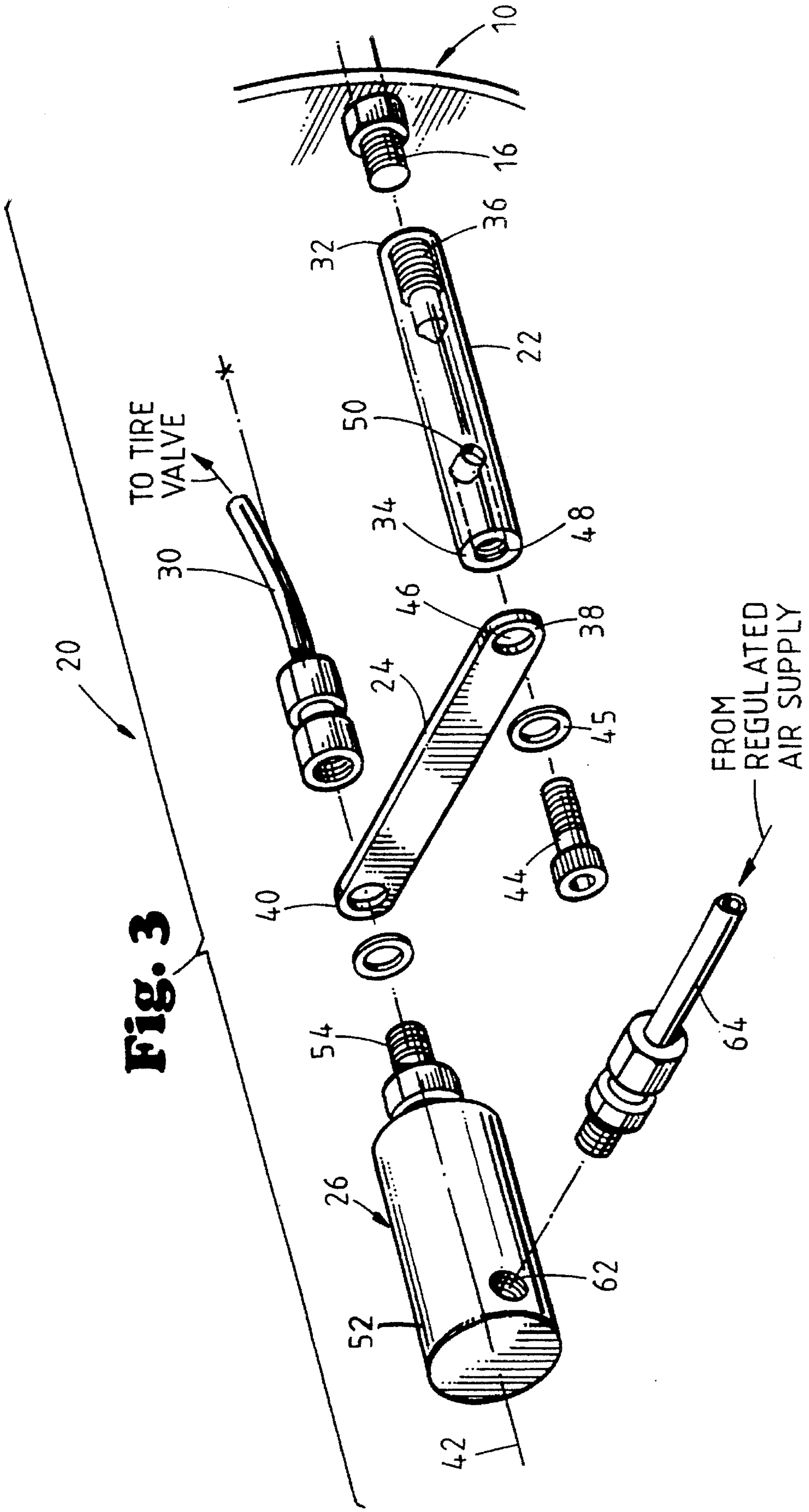
FIG. 3 is an enlarged fragmentary, exploded view of the connections of the presently invention.

Referring now to the drawings, and particularly to FIG. 1, the reference numeral 10 generally indicates a wheel of a vehicle, such as a truck, having a rim 12 with a pneumatic tire 14 thereon, and a plurality of outwardly directed studs, such as studs 16. Such a wheel 10 is conventional. However, such wheels 10 are not easy to change, and generally require specialized road service. Therefore, it is desirable to provide a temporary air inflation system for attachment to the wheel 10 for providing air to the tire 14 to enable the vehicle to continue to a convenient location, if the tire leak is not too severe, for replacement of the tire 14.

Referring now to FIGS. 1 and 3, the reference numeral 20 generally indicates the pneumatic tire air inflation system of the present invention, and generally includes an elongate support 22, a rotatably adjustable arm 24, a rotatable air coupling 26, an air supply 28, and an air outlet line 30.

The elongate support 22 has a first end 32 and a second end 34. The first end 32 includes internal threads 36 for engaging one of the studs 16 for supporting the support 22 from the wheel 10.

The rotatably adjustable arm 24 includes a first end 38 and a second end 40 and the first end 38 is adjustably connected to the second end 34 of the elongate support 22.

A rotatably adjustable connection is provided between the second end 34 of the elongate support 22 and the first end 38 of the arm 24 for rotatably adjusting the position of the second end 40 of the arm, preferably to bring it into alignment with the center line 42 of the axis of the wheel 10. The rotatably adjustable connection may include a pivot screw 44 which is inserted through a washer 45 and an opening 46 in the first end 38 of the arm 24 and is threadably secured in threads 48 in the second end 34 of the elongate support 22. Thus, the angular position of the arm 24 may be adjusted prior to tightening the screw 44. For ease of convenience, a cross opening 50 may be provided in the elongate support 22 for insertion of a tool for conveniently threading the elongate support 22 onto the stud 16. The tool may be an Allenhead wrench which can also be used to secure the screw 44 to the second end 34 of the elongate support 22.

The rotatable air coupling 26 is connected to the second end 40 of the arm 24 and is preferably positioned on the center line 42 of the wheel 10. As best seen in FIG. 2, the rotary union 26 includes a first part 52 and a second part 54, each of which is adapted to receive an air connection for connection to an air passageway 56. The parts 52 and 54 are rotatable to each other through bearings 58 and are sealable relative to each other by a seal 60. The first part 52 includes a port 62 for connection to an air supply line 64. The air passageway 56 extends through the first and second parts 52 and 54 and is in communication with an air outlet line 30 which is connected to the second part 54. The air outlet line 30 is connected to the tire 14 valve stem 66. The air supply line 64 forms a portion of the air supply 28 which may include an air regulator 68, gauge 70, and a connection 72 to an air supply, such as a compressor (not shown) on the vehicle. The air supply line 64 is supportable by a suitable means (not shown) connected to the vehicle.

The air supply is generally a continuous air supply and the regulator 68 is used to shut off the air supply to the tire 14 in the event that it reaches a predetermined amount, for example only, such as 80 psi.

The air inflation system 20 is quickly and easily connectible to the wheel 10 as the elongate support 22 is threaded upon a stud 16, the rotational position of the arm 24 is set and secured by the screw 44 to place the coupling on the center line 22 of the wheel 10, the outlet line 30 is connected to the valve stem 66, and the connector 72 is connected to the vehicle air supply. Since the arm 24 is perpendicular to the support 22 and the coupling 26 is perpendicular to the arm 24, the first part 52 of the coupling 26 will rotate as the wheel 10 rotates while still supplying air to the rotating wheel 10. By the connection of line 64 to the side port 62, the line 64 may be stationary while the part 52 rotates. When the desired location is reached, the system 10 is quickly and easily disconnected.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts, will readily suggest themselves to those skilled in the art and which are encompassed within the spirit of the invention and the scope of the appended claims.

What is claimed is:

1. A portable pneumatic tire air inflation system for attachment to rotating wheels having outwardly directed threaded studs positioned off center on the wheel comprising, an elongate support having first and second ends, the first end including threads for engaging a threaded off center stud on a wheel for supporting the support, a rotatably adjustable arm having first and second ends, said first end connected to the second end of the elongate support, a rotatably adjustable connection between the second end of the support and the first end of the arm for rotatably adjusting the position of the second end of the arm to substantially close to the center line of the wheel, a rotatable air coupling connected to the second end of the arm, said coupling having first and second parts sealably and rotatably movable relative to each other, and an air supply line connected to the first part, and an air outlet line connected to the second part for supplying air to a tire on the wheel.

2. The system of claim 1 wherein the first part of the coupling is a tubular member having a side port connected to the air supply line.

3. The system of claim 1 wherein the arm is positioned perpendicular to the elongate support and the coupling is positioned perpendicularly to the arm.

4. The system of claim 3 wherein the elongate support and the coupling extend perpendicularly away from the arm on opposite sides of the arm.

5. The system of claim 1 wherein the rotatably adjustable connection includes a pivot screw threadably connected to the second end of the elongate support.

* * * * *